April 22, 1924.
J. W. HOLT
1,491,140
PAPER TUBE MAKING MACHINE
Filed Aug. 17, 1920   5 Sheets-Sheet 1
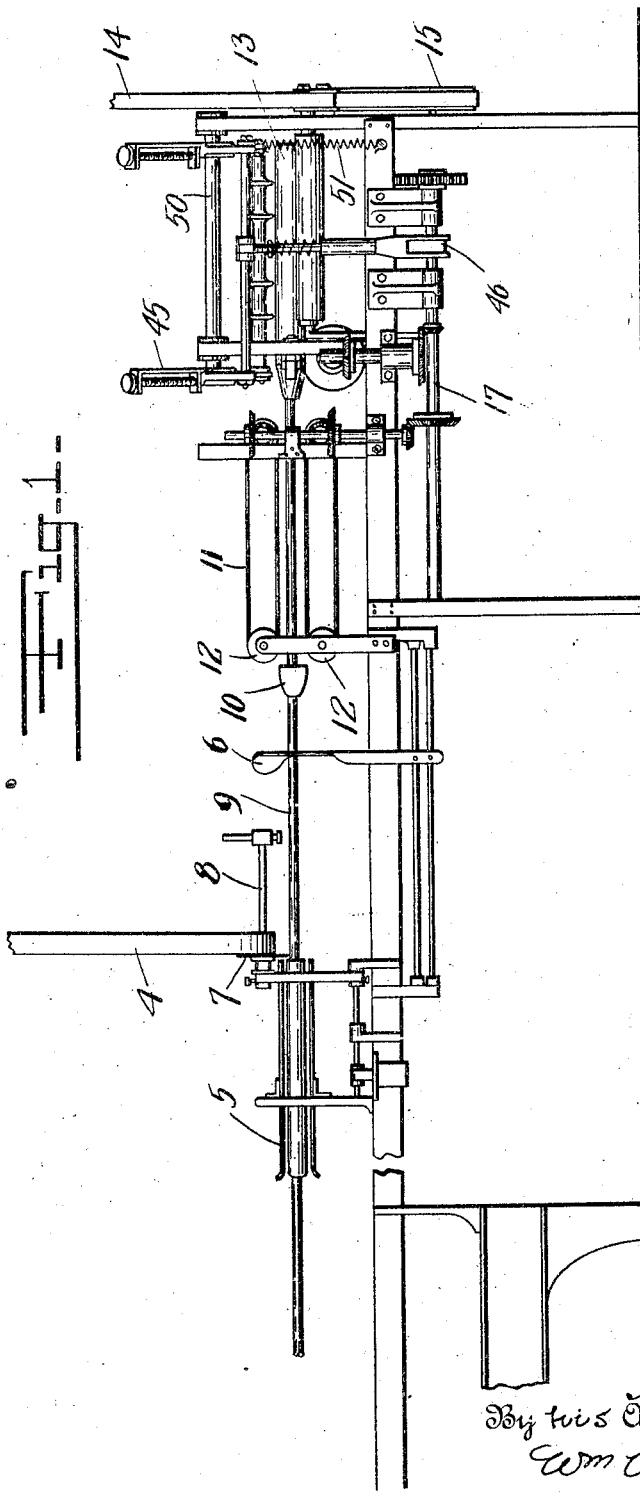
Inventor
Joseph W. Holt
By his Attorney
Wm Wallace White

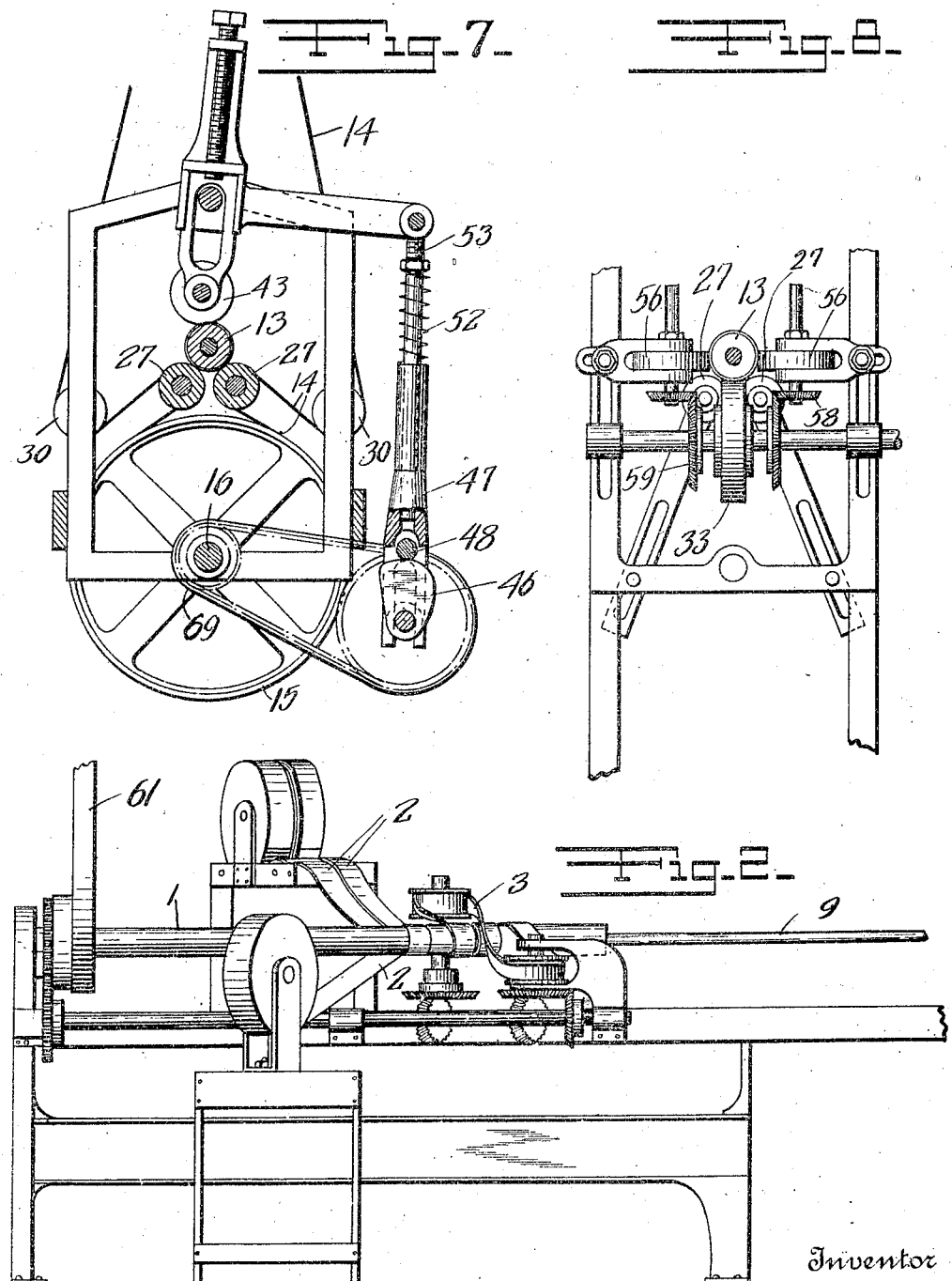

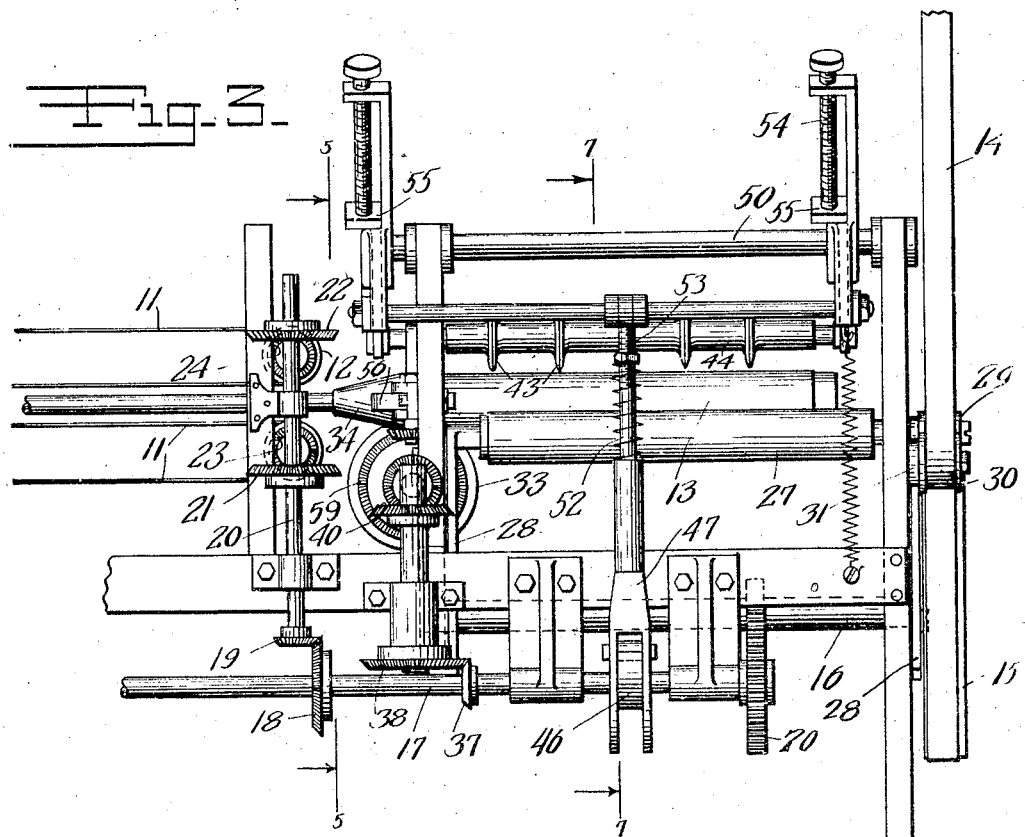
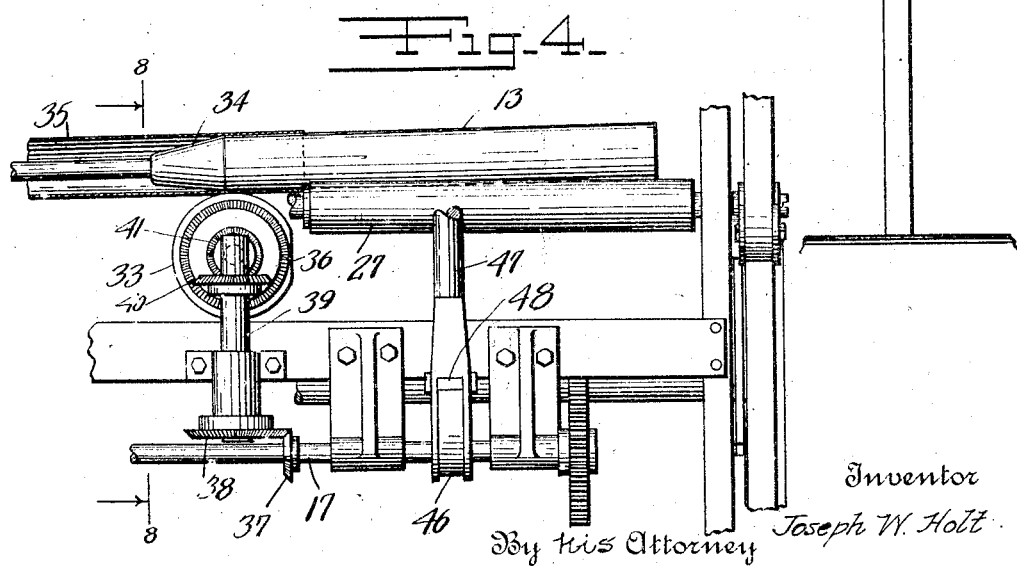

April 22, 1924.
J. W. HOLT
1,491,140
PAPER TUBE MAKING MACHINE
Filed Aug. 17, 1920
5 Sheets-Sheet 4
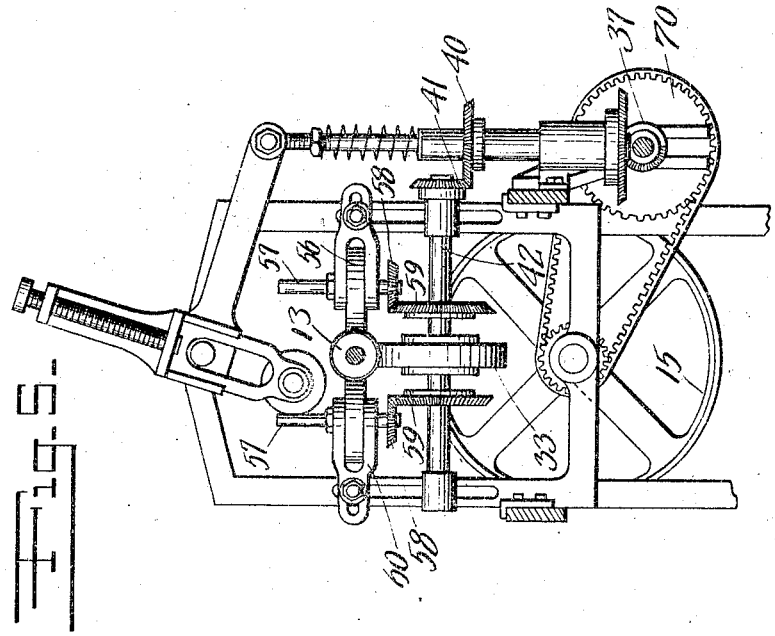
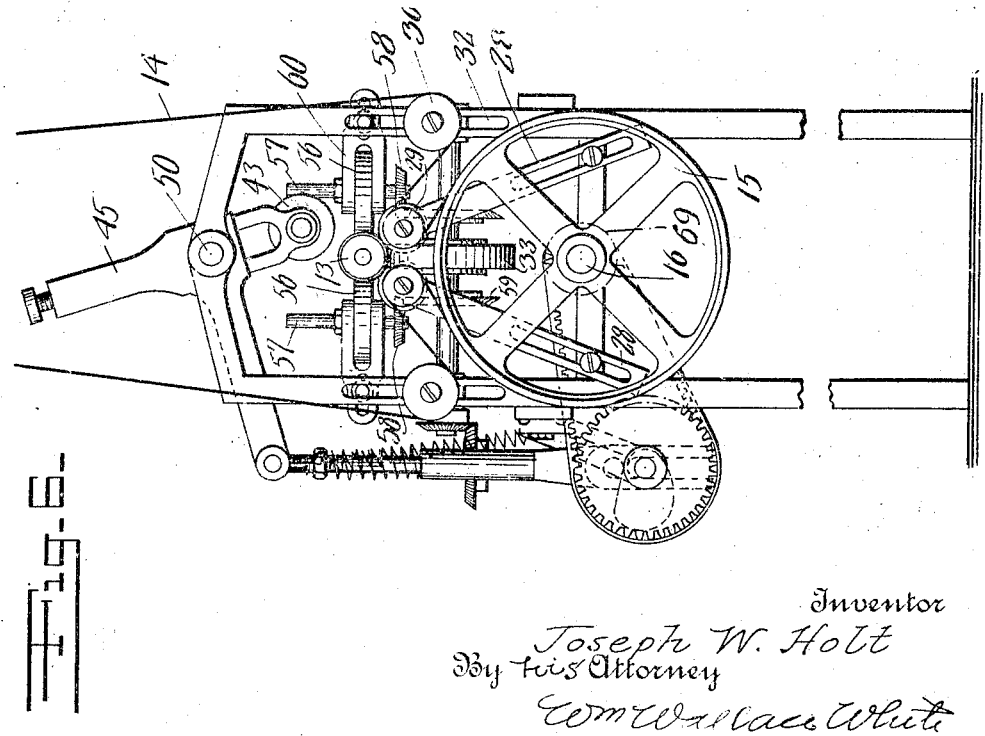
Inventor
Joseph W. Holt
By his Attorney
Wm Wallace White April 22, 1924.
J. W. HOLT
1,491,140
PAPER TUBE MAKING MACHINE
Filed Aug. 17, 1920    5 Sheets-Sheet 5
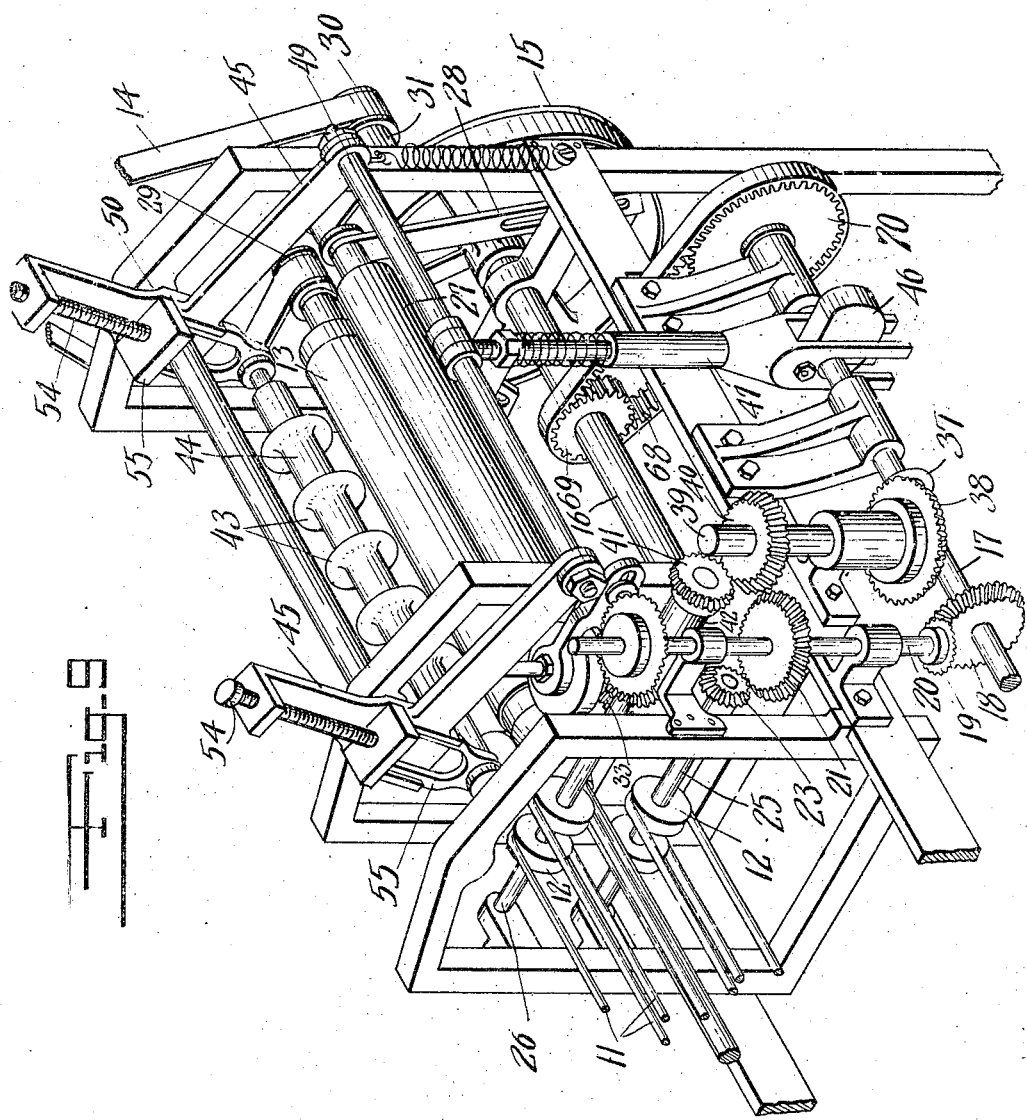
Inventor
Joseph W. Holt
By his Attorney
Wm Wallace White Patented Apr. 22, 1924.

1,491,140

UNITED STATES PATENT OFFICE.

JOSEPH W. HOLT, OF BROOKLYN, NEW YORK, ASSIGNOR TO UNION PAPER COMPANY, OF NEW YORK, N. Y., A CORPORATION OF NEW YORK.

PAPER-TUBE-MAKING MACHINE.

Application filed August 17, 1920. Serial No. 404,066.

*To all whom it may concern:*

Be it known that I, JOSEPH W. HOLT, a citizen of the United States, residing at Brooklyn, in the county of Kings and State of New York, have invented new and useful Improvements in Paper-Tube-Making Machines, of which the following is a specification.

This invention relates to machinery for making paper tubes and like articles, and particularly to a machine of this kind in which the complete operation of making and forming paper tubes and cutting them to finished size, is automatically performed. Part of the original subject-matter of this application is described and claimed in my divisional application, Serial No. 589,994, filed September 23, 1922.

The principal object of my invention is to provide a machine which, when put in operation, automatically glues and winds the paper strips into a tube, rotates and advances the tube as formed, and cuts off the tube in finished sections with smooth ends ready for use as mailing tubes, or ready to receive tops and bottoms to make paper cans or cartons. A further object is to provide a machine in which the tube, as it is formed and advanced along a mandrel, is roughly cut by a revolving saw capable of traveling with the tube into sections of approximately any desired length, these sections being taken up by suitable conveying mechanism and passed to cutting mechanism preferably embodying disc knives which are brought into contact with the cut-off portions of the tube, and cut these portions to the desired finished lengths. Further objects of my invention comprise the development of mechanism for conveying the cut-off portions to the mechanism for cutting to finished size, the provision of means for revolving the cut-off portions, and for bringing the cutting means into contact therewith, and for removing the pieces cut to finished size, as well as mechanism to coordinate these functions and cause them to occur successively and at such a rate as to concur with the speed at which the tube is formed upon the mandrel.

My invention consists further in the construction, combination and arrangement of parts herein described and claimed, and illustrated in the accompanying drawings.

In these drawings, in which I have shown a preferred embodiment of my invention, and in which similar reference characters designate corresponding parts in all views, Fig. 1 is a side elevation of the greater portion of a machine embodying the invention, and particularly the cutting mechanism;

Fig. 2 is a side elevation showing the portion of the machine not shown in Fig. 1, and particularly the forming mechanism;

Fig. 3 is a side elevation, on an enlarged scale, of the mechanism for cutting the tubes to finished sizes;

Fig. 4 is a detail of parts shown in Fig. 3 for feeding cut off sections to the cutting mechanism;

Fig. 5 is a section taken approximately on the line 5—5 of Fig. 3;

Fig. 6 is an end view looking at Fig. 3 from the right;

Fig. 7 is a section taken approximately on the line 7—7 of Fig. 3;

Fig. 8 is a detail section taken approximately on the line 8—8 of Fig. 4; and

Fig. 9 is an isometric view of the same portion of the mechanism as shown in Fig. 3.

Referring to the drawings, in the embodiment of my invention illustrated, the machine comprises a mandrel 1 upon which paper strips 2, one at least of which carries adhesive material, coming in diagonally from the sides are wound by means of a belt 3, operated through suitable gearing driven by a belt 61 from a suitable source of power, which belt 3 forms and advances the tube along the mandrel in the usual manner. The tube as advanced beyond the end of the mandrel is received by guides 5 and advances until the end of it strikes against a lever 6 which operates in the usual manner to bring the wheel 7, having saw teeth on its edge and driven by a belt 4, against the tube to cut it off. Since the tube is rotating and advancing, the saw 7 must be allowed to travel along with the tube until it is cut off, the saw being slidably mounted on a rod 8. This is the usual arrangement and results in the tube being roughly cut into portions of approximately uniform size.

As soon as a portion is cut off, it drops from the end of the guides, thus releasing the lever 6 and permitting the saw 7 to be swung out of the way, and returned to initial position, in the usual manner.

The cut off portions of tube as they drop are received upon a rod 9 fixed to the end of the mandrel 1, and are pushed along the rod 9 by the on-coming tube advancing from the mandrel. The forward end of the cut off portion engages a conical guiding piece 10 which serves to lift the portion off the rod so that it can be engaged by conveying mechanism comprising preferably a number of belts 11 arranged to travel parallel to the rod 9 and supported upon wheels 12 arranged to be driven by suitable mechanism at a speed such that when the tube portion is grasped by the belt, it is dragged rapidly forward at a rate much greater than the rate at which the tube-forming mechanism advances the tube.

This conveying mechanism carries the tube portion forward on to a roller 13 which is mounted, preferably with the use of ball-bearings, in line with and preferably directly upon the rod 9.

The power for operating the conveying and cutting mechanism may be supplied from a suitable source, preferably the same as that supplying the tube-forming mechanism through the belt 61, through a belt 14 arranged to rotate a pulley 15 mounted upon and adapted to rotate a shaft 16 from which power may be transmitted to a countershaft 17 by means of a sprocket chain 68 and sprocket wheels 69 and 70 mounted upon the shaft and countershaft respectively; and a suitable framework is provided for supporting these mechanisms.

The mechanism for driving the belts 11 of the conveyor is preferably operated from the countershaft 17 through bevel wheels 18 on the countershaft, and 19 upon a vertical shaft 20, which vertical shaft 20 carries bevel wheels 21 and 22 engaging bevel wheels 23 and 24 respectively which are fixed to horizontal shafts 25, 26, carrying the wheels 12 which support the belts 11.

The mechanism for rotating the cut-off portion of the tube after it has been forwarded by the conveying mechanism and advanced upon the roller 13, consists of a pair of friction-drive rollers 27 mounted in the frame of the machine, and preferably adjustable as to their position, in such a way that the roller 13 normally rests upon and is supported by the friction-drive rollers when the rod 9 is horizontal, the rod 9 being of considerable length and somewhat flexible. I prefer to mount the rollers 27 upon adjustable arms 28 as well shown in Fig. 6, which may be clamped to rigid portions of the machine frame, and which permit adjustment of the rollers at both ends so that they may be rendered exactly parallel with the tube-receiving roller 13 when this roller has a portion of tube thereon and is in contact with the friction-drive roller 27. The mechanism for rotating the friction-drive rollers preferably comprises pulleys 29 fixed to the same shafts as the rollers and extending beyond the bearings so as to receive a turn of the driving belt 14. The driving belt 14 also passes over adjustable idler pulleys 30, the pins carrying which may be adjusted to different positions along the slots 32 to regulate the tension of the belt.

In order to effect the feeding of tube portions from the conveying mechanism on to the roller 13, as a cut off tube portion is delivered from the conveying mechanism, it is grasped by mechanism including a friction feed wheel 33 mounted immediately under a conical guide portion 34 which is fixed to the rod 9 and serves to guide the tube upon the roller 13. This friction-feed wheel 33 grasps the tube-portion 35 as shown in Fig. 4, and makes the greater part of a revolution, dragging the tube portion rapidly forward upon the roller 13. This wheel 33 is of slightly greater diameter than the distance from its center up to the bottom line of the roller 13, when the roller is in normal position resting upon the friction-drive rollers 27. Consequently this friction feed wheel 33 serves to hold the roller 13 in raised position out of contact with the friction-drive rollers 27 while the tube portion is fed on, as shown in Figures 4 and 8. This friction feed wheel is provided with a flat portion 36 such that when this flat portion is uppermost, the roller 13 is allowed to rest in contact with the friction drive rollers. The diameter of the friction-feed wheel is such that the length of the circumference less the flat portion is at least equal to the length of the roughly cut tube portions.

The mechanism for operating the friction feed wheel is preferably arranged to be driven from the countershaft 17 by means of bevel gears 37, 38, mounted respectively on the countershaft 17 and upon the vertical shaft 39, additional bevel gears 40, 41, being mounted respectively upon the vertical shaft 39 and upon a horizontal shaft 42 upon which the friction feed wheel 33 is mounted. Supplementary feed wheels 56 may be provided on vertical shafts 57 carried in suitable brackets 60 and driven by bevel gears 58 engaging bevel gears 59 on the shaft 42.

The bevel gear 37 upon the shaft 17 is preferably made with the teeth on only one half thereof, so that, during one half revolution of the shaft 17, the friction feed wheel 33 is rotated, and during the other half revolution of the shaft 17, the friction feed wheel remains stationary. The flat portion 36 of the wheel 33 is so arranged with respect to the teeth of the bevel wheel 37 upon the shaft 17 that the flat portion is uppermost during the time that the wheel remains stationary.

While the feed wheel 33 is stationary, with its flat portion uppermost, the roller 13, with a tube portion projected upon it by the feed wheel, rests in contact with the friction drive rollers 27 and rotation is therefore imparted to the roller 13 and the tube-portion resting thereon, so that the tube-portion may now be cut into sections of the desired finished dimensions by the application of suitable knives.

The mechanism for cutting the tube portions to finished sizes consists preferably of a plurality of disc knives 43 mounted upon a shaft 44 carried in arms 45 pivotally mounted on a shaft 50 and arranged to be brought into contact with the roller 13, or thrown out of contact therewith, by the operation of a cam 46 mounted upon the countershaft 17. This cam is so set upon the shaft 17 with respect to the teeth of the bevel gear 37 that the knives 43 are brought into contact with the roller 13 during that portion of the revolution of the shaft 17 that the feed wheel 33 is stationary and with its flat portion uppermost, and the knives are taken out of contact with the roller 13 before the feed wheel again commences to rotate. The connection between the cam and the arms 45 of the knife support comprises a forked rod 47 carrying a roller 48 for cooperation with the cam surface, the forked portion coacting with the shaft 17 to guide the rod, the upper end of the rod being pivotally connected with a cross bar 49 connecting the arms 45 of the knife support so as to rock the support upon the shaft 50 to bring the knives 43 against the roller 13 as shown in Fig. 7.

In order to insure the quick return of the knives 43 to their position, as shown in Fig. 6, out of contact with the roller when the cam permits the return to off position, a spring 51 is preferably provided. In order that the knives may not be pressed with injurious force against the rollers, a spring 52 may be associated with the operating rod 47, extending upward from the cam 46 to the cross-bar 49, the rod 47 preferably having a slidably arranged portion 53 normally held extended by the spring 52. The position of the shaft carrying the knives is preferably made adjustable by means of the screws 54 carried in the arms 45 arranged to move the slides 55 forming adjustable parts of the arms 45 in which the knife-carrying shaft 44 is mounted, so as to render the knives parallel with the roller 13 and to permit them to come just against the surface thereof without cutting into the roller and injuring either the knives or the roller.

The operation of the machine may be outlined as follows:

The tube is formed in the usual way as indicated in Fig. 2, being given a rotating and advancing movement. When the end reaches the lever 6, the usual mechanism is tripped, bringing the saw 7 into action to cut off a portion of the advancing tube. The cut off portion falls, releasing the saw mechanism and permitting it to repeat the cycle of operations outlined, and the cut off portion is supported by the rod 9. The advancing tube pushes forward the cut off portion, which passes beneath the lever 6, and engages the conical guide 10 which lifts it off the rod 9 and permits it to be grasped by the belts 11.

These belts draw the tube portion rapidly forward, making room for the succeeding tube, up to the end of the roller 13, when the feed wheel 33 comes into action. The belts 11, the feed mechanism and the cutting mechanism are all operated from the shaft 17, driven from the belt 14, which also rotates continuously the friction drive rollers 27. Consequently, the actions of these mechanisms are all coordinated.

When the tube portion delivered by the belts reaches the feed wheel 33, the wheel is in position with its flat portion uppermost the cam 46 is in a position such that the knives are out of contact with the roller 13, the roller 13 with a tube portion cut to finished size is resting upon the drive rollers 27, and the teeth of the bevel gear 37 having teeth on one half of its face only are about to engage the teeth of the gear 38. As soon as these teeth do engage, the friction feed wheel 33 is put in motion, grips the tube portion, raises the roller 13, and advances a tube portion thereon, ejecting the finished piece from the end of the roller 13. When the tube portion is on the roller 13, the wheel 33 completes a revolution, stopping with its flat portion uppermost as the rotation of the shaft 17 carries the teeth of the wheel 37 out of engagement with those of the wheel 38, this position of the wheel 33 permitting the roller 13 with the tube portion thereon, to rest upon the drive rollers 27 and be rotated thereby. Continued rotation of the shaft 17 brings the cam 46 into action, bringing the knives 43 against the roller 13, cutting the tube portion to finished sizes, and permitting the knives to be withdrawn by the spring 51 as the shaft 17 completes a revolution, so that the knives are out of the way when the feed wheel 33 is again brought into action to advance another tube portion and eject the finished pieces.

The belt 14 and the mechanism for forming the tube driven by the belt 61 are preferably driven from the same source of power, in order that the sequence of cutting operations may be performed upon the tube portions in the same period of time that is required to form a length of tube equal to that of the cut off portions.

Having now described my invention, I claim and desire to secure by Letters Patent:

1. A machine for making finished paper tubes and the like of predetermined lengths, comprising in combination tube forming and advancing mechanism, cutting off mechanism, and means for revolving and cutting to finished sizes the cut off portions.

2. A machine for making finished paper tubes and the like of predetermined lengths, comprising in combination, tube forming and advancing mechanism, cutting off mechanism, mechanism for revolving the cut off portions, mechanism for advancing the cut off portions to said revolving mechanism, means for cutting said portions to finished size, and means for operating in synchronism said mechanism for advancing and cutting to size said cut off portions.

3. A machine for making finished paper tubes and the like of predetermined lengths, comprising in combination, tube forming and advancing mechanism, cutting off mechanism, mechanism for revolving and cutting to finished sizes the cut off portions, and means arranged to carry the cut off portions to the revolving mechanism at a rate materially greater than the advancing rate of the tube.

4. A machine for making finished paper tubes or the like of predetermined lengths, comprising in combination, tube forming and advancing mechanism, cutting off mechanism, a roller arranged to receive the cut off portions, disc knives mounted adjacent said roller, means for rotating said knives and roller, and means for bringing said knives against the roller to cut the tube portions to finished sizes.

5. In a machine for making finished paper tubes of predetermined lengths, the combination comprising, tube forming and advancing mechanism, cutting off mechanism, means for imparting rotation to cut off tube portions, and means for intermittently advancing cut off portions to said means for imparting rotation thereto.

6. A machine for making finished paper tubes and the like of predetermined lengths, comprising in combination, tube forming and advancing mechanism, cutting off mechanism, means for imparting rotation to cut off tube portions, means for intermittently advancing cut off portions to said means for imparting rotation thereto, knives, and means for bringing said knives into contact with the cut off portions while rotated by said means.

7. In a machine for making finished paper tubes and the like of predetermined lengths, the combination comprising, tube forming and advancing mechanism, cutting off mechanism, a roller, means for advancing a cut off tube portion on to said roller, a source of power, and means for bringing said roller with a tube portion thereon into contact with said source of power to cause rotation of said roller and tube portion.

8. A machine for making finished paper tubes and the like of predetermined lengths, comprising in combination, tube forming and advancing mechanism, cutting off mechanism, a roller, means for advancing a cut off tube portion on to said roller, a source of power, means for bringing said roller with a tube portion thereon into contact with said source of power, knives, means for actuating said knives to cut the rotating tube portion to finished sizes and to retract said knives, and means for withdrawing said roller from contact with the source of power to permit removal of the finished tubes.

9. A machine for making finished paper tubes and the like of predetermined lengths, comprising in combination, tube forming and advancing mechanism, cutting off mechanism, mechanism for receiving and rotating cut off portions, revolubly mounted disc knives, a mounting for said knives arranged to permit them to be brought against a rotating tube portion and retracted, a rotating shaft, a cam thereon, and connecting means between said cam and mounting.

10. A machine for making finished paper tubes and the like of predetermined lengths, comprising in combination, tube forming and advancing mechanism, cutting off mechanism, mechanism for receiving and rotating cut off portions, revolubly mounted disc knives, a mounting for said knives arranged to permit them to be brought against a rotating tube portion and retracted, a rotating shaft, a cam thereon, connecting means between said cam and mounting, and yieldable means associated with said connecting means to control the pressure exerted by the knives.

11. A machine for making finished paper tubes and the like of predetermined lengths, comprising in combination, tube forming and advancing mechanism, cutting off mechanism, mechanism for receiving and rotating cut off portions, revolubly mounted disc knives, a mounting for said knives arranged to permit them to be brought against a rotating tube portion and retracted, a rotating shaft, a cam thereon, connecting means between said cam and mounting and a spring arranged to retract said knives.

12. A machine for making finished paper tubes and the like of predetermined lengths, comprising in combination, mechanism for forming a tube and imparting rotating and advancing movement thereto, mechanism for cutting off portions of the tube as formed, endless traveling belts arranged to advance said cut off portions, means for guiding said portions to said belts, and mechanism for receiving, rotating and cutting to finished size said cut off portions.

13. A machine for making finished paper tubes and the like of predetermined lengths, comprising in combination, mechanism for forming a tube and imparting rotation and advancing movement thereto, mechanism for cutting off portions of the tube as formed, mechanism for advancing said cut off portions, a driven shaft, means operated from said driven shaft for actuating said cut off portion advancing mechanism, means for rotating and cutting to finished size said cut off portions, a feed wheel arranged to feed cut off portions from the advancing mechanism to the rotating mechanism, and means operated from said driven shaft to actuate said feed wheel intermittently.

14. A machine for making finished paper tubes and the like of predetermined lengths, comprising in combination, mechanism for forming a tube and imparting rotating and advancing movement thereto, mechanism for cutting off portions of the advancing and rotating tube, means for receiving and imparting rotation to the cut off portions of tube, revoluble disc knives, a shaft carrying said knives, a pivotally mounted support for said shaft, and mechanism to rock said support to bring said knives toward and away from said roller.

15. A machine for making finished paper tubes and the like of predetermined lengths, comprising in combination, tube forming and advancing mechanism, cutting off mechanism, means for revolving and cutting to finished sizes the cut off portions, and mechanism for driving said means for revolving and cutting the cut off portions to effect the finishing of a cut off portion in the same time that a length of tube equal to that of a cut off portion is formed.

16. A machine for making finished paper tubes and the like of predetermined lengths, comprising in combination, tube forming and advancing mechanism, cutting off mechanism, means for imparting rotation to the cut off tube portions, means for cutting said portions to finished sizes, means for advancing tube portions to said rotating mechanism, and means for actuating alternately said advancing and said cutting means.

In testimony whereof I have signed my name to this specification.

JOSEPH W. HOLT.